United States Patent
Yang

(10) Patent No.: US 8,727,089 B2
(45) Date of Patent: May 20, 2014

(54) CENTRIFUGAL FORCE CUTTING OFF SLIDING DAMPING TYPE TORQUE ACTUATED CLUTCH

(76) Inventor: Tai-Her Yang, Dzan-Hwa (TW)

( * ) Notice: Subject to any disclaimer, the term of this patent is extended or adjusted under 35 U.S.C. 154(b) by 27 days.

(21) Appl. No.: 12/805,280

(22) Filed: Jul. 22, 2010

(65) Prior Publication Data

US 2012/0018268 A1 Jan. 26, 2012

(51) Int. Cl.
*F16D 43/22* (2006.01)
(52) U.S. Cl.
USPC ....... 192/35; 192/54.52; 192/55.1; 192/103 R
(58) Field of Classification Search
USPC .......... 192/48.1, 54.52, 54.5, 54.1, 55.1, 54.2
See application file for complete search history.

(56) References Cited

U.S. PATENT DOCUMENTS

| | | | | | |
|---|---|---|---|---|---|
| 3,224,541 | A | * | 12/1965 | Yamamoto | 192/105 CD |
| 4,538,713 | A | * | 9/1985 | Wasada | 192/54.51 |
| 4,889,215 | A | * | 12/1989 | Ohkanda | 192/48.1 |
| 2012/0018269 | A1 | * | 1/2012 | Yang | 192/31 |

* cited by examiner

*Primary Examiner* — Rodney Bonck
(74) *Attorney, Agent, or Firm* — Bacon & Thomas, PLLC

(57) ABSTRACT

The present invention relates to a centrifugal force cutting off sliding damping type torque-actuated clutch capable of controlling a clutch device to perform operations of coupling or disengaging with the driving torque, characterized in that a relay transmission structure assembly (104) is installed between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, and a centrifugal force cutting type centrifugal clutch (2006) is installed between the relay transmission structure assembly (104) and the static housing (107).

14 Claims, 5 Drawing Sheets

CENTRIFUGAL FORCE CUTTING OFF SLIDING DAMPING TYPE TORQUE ACTUATED CLUTCH

BACKGROUND OF THE INVENTION (a) Field of the Invention

A centrifugal force cutting off sliding damping type clutch actuated by torque is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, and the prime motive end (101) is provided with a limiting structure (115) for limiting relative positions of the relay transmission structure assembly (104) and the prime motive end (101);

a centrifugal force cutting type centrifugal clutch (2006) and a limit-torque sliding damping device (106) are installed between the relay transmission structure assembly (104) and the static housing (107) and is rotated in a first rotational direction at the prime motive end (101), thereby when the active side of relay coupling structure of the relay coupling structure (204) installed in the relay transmission structure assembly (104) is driven, a sliding damping effect is generated by the centrifugal force cutting type centrifugal clutch (2006) and the limit-torque sliding damping device (106) installed between the relay transmission structure assembly (104) and the static housing (107) such that the passive side of relay output coupling structure is driven by the active side of relay coupling structure to move, and the relay transmission structure assembly (104) and a relay output clutch structure (1051) installed in the relay transmission structure assembly (104) are driven to perform closing/opening operations with the output-end clutch structure (1052) installed at the output end (102) so as to transmit rotary kinetic energy, and to force a recovering actuation spring (120) provided between the relay output clutch structure (1051) and the output-end clutch structure (1052) being tightened; when reaching a set rotational speed, the centrifugal force cutting type centrifugal clutch (2006) cuts the connection between the relay transmission structure assembly (104) and the limit-torque sliding damping device (106) and the static housing (107); and through the driving torque from the prime motive end (101) to the output end (102), the passive side of relay output coupling structure is continuously driven by the active side of relay coupling structure, so the relay transmission structure assembly (104) and the relay output clutch structure (1051) installed in the relay transmission structure assembly (104) are further driven to perform closing/opening operations with the output-end clutch structure (1052) installed at the output end (102) so as to transmit rotary kinetic energy, and to force the recovering actuation spring (120) provided between the relay output clutch structure (1051) and the output-end clutch structure (1052) being tightened;

when the rotational driving torque at the prime motive end (101) is no longer provided, the relay transmission structure assembly (104) is returned and the relay output clutch structure (1051) and the output-end clutch structure (1052) are disengaged through actions of the recovering actuation spring (120), thereby the output end (102) is released.

(b) Description of the Prior Art

A conventional single-way clutch (S.W.C.) or an over running clutch (O.R.C) has following transmission features:

when an active side is driven in one rotation direction, e.g. the clockwise direction, a passive side is able to be linked; on the other hand, when the passive side is driven in the counterclockwise direction, the active side is able to be linked;

when the active side is driven in the counterclockwise direction, the passive side is not able to be linked; when the passive side is driven in the clockwise direction, the active side is not able to be linked, the abovementioned are its transmission features;

when the active side is desired to be driven in one of the directions, e.g. the clockwise direction, the passive side is able to be linked for rotational outputting, and when the passive side is driven in the counterclockwise direction, the active side is not able to be linked, which is not the function that the conventional single-way transmission device can provide.

SUMMARY OF THE INVENTION

A centrifugal force cutting off sliding damping type clutch actuated by torque is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, and the prime motive end (101) is provided with a limiting structure (115) for limiting relative positions of the relay transmission structure assembly (104) and the prime motive end (101);

a centrifugal force cutting type centrifugal clutch (2006) and a limit-torque sliding damping device (106) are installed between the relay transmission structure assembly (104) and the static housing (107) and is rotated in a first rotational direction at the prime motive end (101), thereby when the active side of relay coupling structure of the relay coupling structure (204) installed in the relay transmission structure assembly (104) is driven, a sliding damping effect is generated by the centrifugal force cutting type centrifugal clutch (2006) and the limit-torque sliding damping device (106) installed between the relay transmission structure assembly (104) and the static housing (107) such that the passive side of relay output coupling structure is driven by the active side of relay coupling structure to move, and the relay transmission structure assembly (104) and a relay output clutch structure (1051) installed in the relay transmission structure assembly (104) are driven to perform closing/opening operations with the output-end clutch structure (1052) installed at the output end (102) so as to transmit rotary kinetic energy, and to force a recovering actuation spring (120) provided between the relay output clutch structure (1051) and the output-end clutch structure (1052) being tightened; when reaching a set rotational speed, the centrifugal force cutting type centrifugal clutch (2006) cuts the connection between the relay transmission structure assembly (104) and the limit-torque sliding damping device (106) and the static housing (107); and through the driving torque from the prime motive end (101) to the output end (102), the passive side of relay output coupling structure is continuously driven by the active side of relay coupling structure, so the relay transmission structure assembly (104) and the relay output clutch structure (1051) installed in the relay transmission structure assembly (104)

are further driven to perform closing/opening operations with the output-end clutch structure (1052) installed at the output end (102) so as to transmit rotary kinetic energy, and to force the recovering actuation spring (120) provided between the relay output clutch structure (1051) and the output-end clutch structure (1052) being tightened;

when the rotational driving torque at the prime motive end (101) is no longer provided, the relay transmission structure assembly (104) is returned and the relay output clutch structure (1051) and the output-end clutch structure (1052) are disengaged through actions of the recovering actuation spring (120), thereby the output end (102) is released.

DESCRIPTION OF MAIN COMPONENT SYMBOLS

Figure 1:
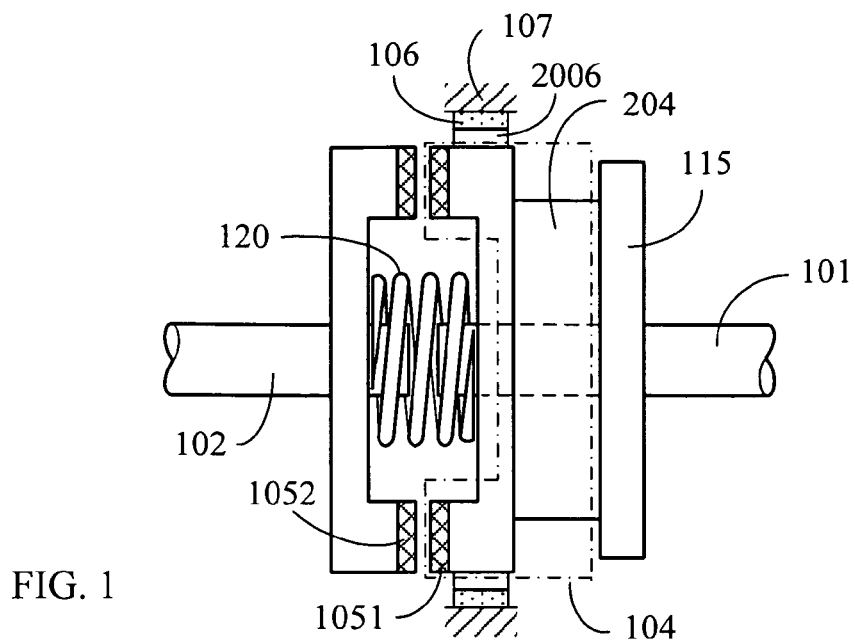
FIG. 1 is a schematic view of the structural theory of the centrifugal force cutting off sliding damping type clutch actuated by torque of the present invention.

101: prime motive end
102: output end
104: relay transmission structure assembly
106: limit-torque sliding damping device
107: static housing
115: limiting structure
120: recovering actuation spring
204: relay coupling structure
1041: screw rod structure
1042: screw nut structure
1043: coil-shaped spring capable of rotating for axial actuation
1051: relay output clutch structure
1052: output-end clutch structure
1060: axial compelling over running clutch
1061: active side of axial compelling over running clutch
1062: passive side of axial compelling over running clutch
1063: middle rolling member
1071: active side of axial relay clutch
1072: axial clutch transmission block
1073: axial clutch transmission block recovering spring
1074: axial relay clutch transmission board
1075: middle rolling member
1076: passive side of axial relay clutch
1077: axial clutch structure
1079: transmission end
1081: active side of radial relay clutch
1082: radial clutch transmission block
1083: radial clutch transmission block recovering spring
1084: radial relay clutch transmission board
1085: middle rolling member
1086: passive side of radial relay clutch
1087: radial clutch structure
1089: transmission end
2006: centrifugal force cutting type centrifugal clutch

DETAILED DESCRIPTION OF THE PREFERRED EMBODIMENTS

Figure 2:
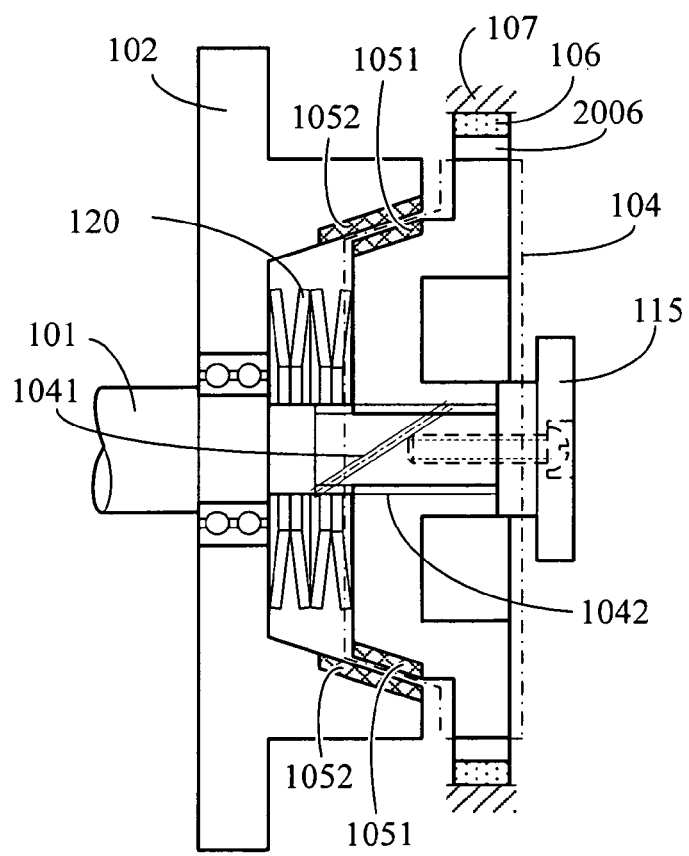
FIG. 2 is a schematic structural view of one embodiment illustrating that the relay coupling structure installed in the relay transmission structure assembly (104) is composed by the screw rod structure (1041) having axial actuation screw angle and the screw nut structure (1042) having axial actuation screw angle.

The present invention relates to a centrifugal force cutting off sliding damping type clutch actuated by torque is disclosed, characterized in that being capable of controlling a clutch device to perform operations of coupling or disengaging with the driving torque, and being equipped with a relay transmission structure assembly (104) between a rotary prime motive end (101) and an output-end clutch structure (1052) installed at an output end (102), the relay transmission structure assembly (104) is installed with a relay coupling structure (204) having an active side of relay coupling structure and a passive side of relay coupling structure, and the prime motive end (101) is provided with a limiting structure (115) for limiting relative positions of the relay transmission structure assembly (104) and the prime motive end (101);

a centrifugal force cutting type centrifugal clutch (2006) and a limit-torque sliding damping device (106) are installed between the relay transmission structure assembly (104) and the static housing (107) and is rotated in a first rotational direction at the prime motive end (101), thereby when the active side of relay coupling structure of the relay coupling structure (204) installed in the relay transmission structure assembly (104) is driven, a sliding damping effect is generated by the centrifugal force cutting type centrifugal clutch (2006) and the limit-torque sliding damping device (106) installed between the relay transmission structure assembly (104) and the static housing (107) such that the passive side of relay output coupling structure is driven by the active side of relay coupling structure to move, and the relay transmission structure assembly (104) and a relay output clutch structure (1051) installed in the relay transmission structure assembly (104) are driven to perform closing/opening operations with the output-end clutch structure (1052) installed at the output end (102) so as to transmit the rotary kinetic energy, and to force a recovering actuation spring (120) provided between the relay output clutch structure (1051) and the output-end clutch structure (1052) being tightened; when reaching a set rotational speed, the centrifugal force cutting type centrifugal clutch (2006) cuts the connection between the relay transmission structure assembly (104) and the limit-torque sliding damping device (106) and the static housing (107); and through the driving torque from the prime motive end (101) to the output end (102), the passive side of relay output coupling structure is continuously driven by the active side of relay coupling structure, so the relay transmission structure assembly (104) and the relay output clutch structure (1051) installed in the relay transmission structure assembly (104) are further driven to perform closing/opening operations with the output-end clutch structure (1052) installed at the output end (102) so as to transmit the rotary kinetic energy, and to force the recovering actuation spring (120) provided between the relay output clutch structure (1051) and the output-end clutch structure (1052) being tightened;

when the rotational driving torque at the prime motive end (101) is no longer provided, the relay transmission structure assembly (104) is returned and the relay output clutch structure (1051) and the output-end clutch structure (1052) are disengaged through actions of the recovering actuation spring (120), thereby the output end (102) is released;

FIG. 1 is a schematic view of the structural theory of the present invention;

As shown in FIG. 1, it mainly consists of:

a prime motive end (101): composed by a rotational mechanism for inputting rotary kinetic energy; the prime motive end (101) is served to drive an active side of relay coupling structure of a relay coupling structure (204) installed in a relay transmission structure assembly (104), and the prime motive end (101) is installed with a limiting structure (115) for limiting relative positions of the relay transmission structure assembly (104) and the prime motive end (101);

an output end (102): composed by a rotational mechanism for outputting rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational driving and axial movements, the relay transmission structure assembly (104) is provided with a relay coupling structure (204) driven by the prime motive end (101), the relay coupling structure (204) has an active side of relay coupling structure and a passive side of relay coupling structure coaxially coupled and interacted with the active side, a centrifugal force cutting type centrifugal clutch (2006) and a limit-torque sliding damping device (106) are installed between the mentioned transmission structure assembly (104) and the static housing (107), when the active side of the relay coupling structure is driven by the prime motive end (101) to apply rotational driving torque to the passive side of relay coupling structure, a sliding damping effect is generated by the centrifugal force cutting type centrifugal clutch (2006) in an engaged state and the limit-torque sliding damping device (106) installed between the relay transmission structure assembly (104) and the static housing (107) such that the passive side of relay coupling structure is driven to move, and further enables the relay transmission structure assembly (104) to generate a relative movement, so as to drive the relay output clutch structure (1051) installed in the relay transmission structure assembly (104) to perform closing/opening operations with an output-end clutch structure (1052) for transmitting rotary kinetic energy, and to force a recovering actuation spring (120) being tightened; when reaching a set rotational speed, the centrifugal force cutting type centrifugal clutch (2006) cuts the connection between the relay transmission structure assembly (104) and the limit-torque sliding damping device (106) and the static housing (107); and through the driving torque from the prime motive end (101) to the output end (102), the passive side of relay output coupling structure is continuously driven by the active side of relay coupling structure, thereby the relay transmission structure assembly (104) and the relay output clutch structure (1051) installed in the relay transmission structure assembly (104) are further driven to perform closing/opening operations with the output-end clutch structure (1052) installed at the output end (102) so as to transmit rotary kinetic energy, and to force the recovering actuation spring (120) provided between the relay output clutch structure (1051) and the output-end clutch structure (1052) being tightened;

when the rotational driving torque from the prime motive end (101) to the output end (102) is no longer provided, the relay output clutch structure (1051) and the output-end clutch structure (1052) are disengaged and the passive side of relay coupling structure is returned through a releasing recovering effect provided by the recovering actuation spring (120), thereby terminating the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107), and is installed between the centrifugal force cutting type centrifugal clutch (2006) and the static housing (107), so through actions of the limit-torque sliding damping device (106), relative movements are generated between the active side of relay coupling structure and the passive side of relay coupling structure combined in the relay transmission structure assembly (104) when the active side of relay coupling structure is driven by the prime motive end (101) to perform rotational driving;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force cutting type centrifugal clutch (2006): configured by a device having limit-torque damping function and being controlled by the centrifugal force to be in a cut state while reaching a set rotational speed and be in an engaged state while being static or in low speed so as to restrain the rotational motion between the relay transmission structure assembly (104) and the static housing (107), and is installed between the relay transmission structure assembly (104) and the limit-torque sliding damping device (106), when the active side of relay coupling structure is driven by the prime motive end (101) to perform rotational driving, with a sliding damping effect generated through the centrifugal force cutting type centrifugal clutch (2006) being combined with the limit-torque sliding damping device (106), a relative movement is generated between the active side of relay coupling structure and the passive side of relay coupling structure combined in the relay transmission structure assembly (104);

a static housing (107): configured by a static housing structure for accommodating the centrifugal force cutting off sliding damping type clutch actuated by torque;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the active side of relay coupling structure is driven by the prime motive end (101), the relay output clutch structure (1051) and the relay transmission structure assembly (104) are driven by the active side of relay coupling structure of the relay coupling structure (204), for performing closing/opening operations with the output-end clutch structure (1052) so as to transmit the rotary kinetic energy, and when the driving force from the prime motive end (101) to the output end (102) is no longer provided, the relay output clutch structure (1051) and the output-end clutch structure (1052) are disengaged through the releasing elastic force of the recovering actuation spring (120), thereby terminating the transmission of the rotary kinetic energy;

an output-end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force cutting off sliding damping type torque-actuated clutch of the present invention, the relay coupling structure (204) installed in the relay transmission structure assembly (104) can be further composed by a screw rod structure (1041) and a screw nut structure (1042);

FIG. 2 is a schematic structural view of one embodiment illustrating that the relay coupling structure installed in the relay transmission structure assembly (104) is composed by the screw rod structure (1041) having axial actuation screw angle and the screw nut structure (1042) having axial actuation screw angle.

Figure 3:
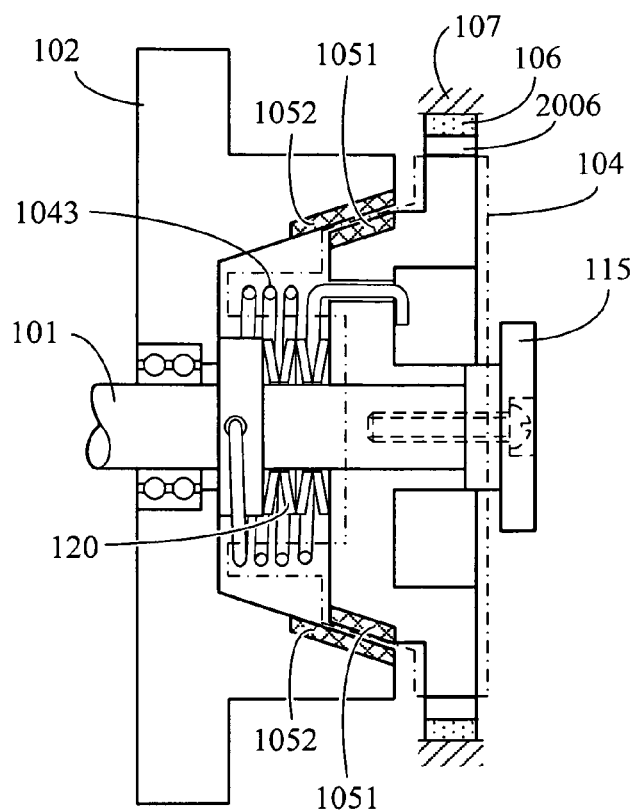
FIG. 3 is a schematic structural view of one embodiment illustrating that the relay coupling structure installed in the relay transmission structure assembly (104) is composed by the coil-shaped spring capable of rotating for axial actuation (1043).

As shown in FIG. 2, it mainly consists of:

a prime motive end (101): composed by a rotational mechanism for inputting rotary kinetic energy; the prime motive end (101) is a screw rod structure (1041) constituting the function of active end of relay coupling structure, for driving the relay transmission structure assembly (104); the prime motive end (101) is installed with a limiting structure (115) for limiting relative positions of the relay transmission structure assembly (104) and the prime motive end (101);

an output end (102): composed by a rotational mechanism for outputting the rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational driving and axial movements, the relay transmission structure assembly (104) is installed with a relay coupling structure driven by the prime motive end (101), the relay coupling structure has the function of the active side of relay coupling structure composed by the screw rod structure (1041) and the function of the passive side of relay coupling structure composed by the screw nut structure (1042), the screw rod structure (1041) and the screw nut structure (1042) are coaxially coupled and interacted, the mentioned passive side of relay coupling structure composed by the screw nut structure (1042) is connected to the relay transmission structure assembly (104), a centrifugal force cutting type centrifugal clutch (2006) and a limit-torque sliding damping device (106) are installed between the relay transmission structure assembly (104) and the static housing (107), when the screw rod structure (1041) is driven by the prime motive end (101) to apply the rotational driving torque to the screw nut structure (1042), through a sliding damping effect generated by the centrifugal force cutting type centrifugal clutch (2006) being in an engaged state and the limit-torque sliding damping device (106) installed between the relay transmission structure assembly (104) and the static housing (107), the relay transmission structure assembly (104) connected with the screw nut structure (1042) generates a relative axial movement for driving the relay output clutch structure (1051) installed in the relay transmission structure assembly (104) to perform closing/opening operations with the output-end clutch structure (1052) for transmitting the rotary kinetic energy, and forcing the recovering actuation spring (120) being tightened, and when reaching a set rotational speed, the centrifugal force cutting type centrifugal clutch (2006) cuts the connection between the relay transmission structure assembly (104) and the static housing (107); meanwhile through the driving torque from the prime motive end (101) to the output end (102), the passive side of relay output coupling structure is continuously driven by the active side of relay coupling structure, so the relay transmission structure assembly (104) and the relay output clutch structure (1051) installed in the relay transmission structure assembly (104) are driven to perform closing/opening operations with the output-end clutch structure (1052) installed at the output end (102) so as to transmit the rotary kinetic energy and to force the recovering actuation spring (120) provided between the relay output clutch structure (1051) and the output-end clutch structure (1052) being tightened;

when the rotational driving torque from the prime motive end (101) to the output end (102) is no longer provided, the relay output clutch structure (1051) and the output-end clutch structure (1052) are disengaged and the screw nut structure (1042) is returned, thereby terminating the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107), and is installed between the centrifugal force cutting type centrifugal clutch (2006) and the static housing (107); when the screw rod structure (1041) is rotationally driven by the prime motive end (101), through actions of the limit-torque sliding damping device (106), relative movements are generated between the screw rod structure (1041) and the screw nut structure (1042) combined in the relay transmission structure assembly (104) during the screw rod structure (1041) performing rotational driving to the screw nut structure (1042);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force cutting type centrifugal clutch (2006): configured by a device having limit-torque damping function and being controlled by the centrifugal force to be in a cut state while reaching a set rotational speed and be in an engaged state while being static or in low speed so as to restrain the rotational motion between the relay transmission structure assembly (104) and the static housing (107), and is installed between the relay transmission structure assembly (104) and the limit-torque sliding damping device (106), when the screw rod structure (1041) is driven by the prime motive end (101) to perform rotational driving, with a sliding damping effect generated through the centrifugal force cutting type centrifugal clutch (2006) being combined with the limit-torque sliding damping device (106), a relative movement is generated between the screw rod structure (1041) and the screw nut structure (1042) combined in the relay transmission structure assembly (104) while the screw rod structure (1041) performs rotation driving to the screw nut structure (1042);

a static housing (107): configured by a static housing structure for accommodating the centrifugal force cutting off sliding damping type clutch actuated by torque;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the screw rod structure (1041) is driven by the prime motive end (101), the relay output clutch structure (1051) and the relay transmission structure assembly (104) are driven by the screw rod structure (1041) of the relay coupling structure, for performing closing/opening operations with the output-end clutch structure (1052) so as to transmit the rotary kinetic energy and to force the recovering actuation spring (120) being tightened, and when the rotational driving torque from the prime motive end (101) to the output end (102) is no longer provided, the relay output clutch structure (1051) and the output-end clutch structure (1052) are disengaged through the releasing elastic force of the recovering actuation spring (120), thereby further terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force cutting off sliding damping type torque-actuated clutch of the present invention, the relay coupling structure installed in the relay transmission structure assembly (104) can be further composed by a coil-shaped spring capable of rotating for axial actuation (1043);

FIG. 3 is a schematic structural view of one embodiment illustrating that the relay coupling structure installed in the relay transmission structure assembly (104) is composed by the coil-shaped spring capable of rotating for axial actuation (1043).

Figure 4:
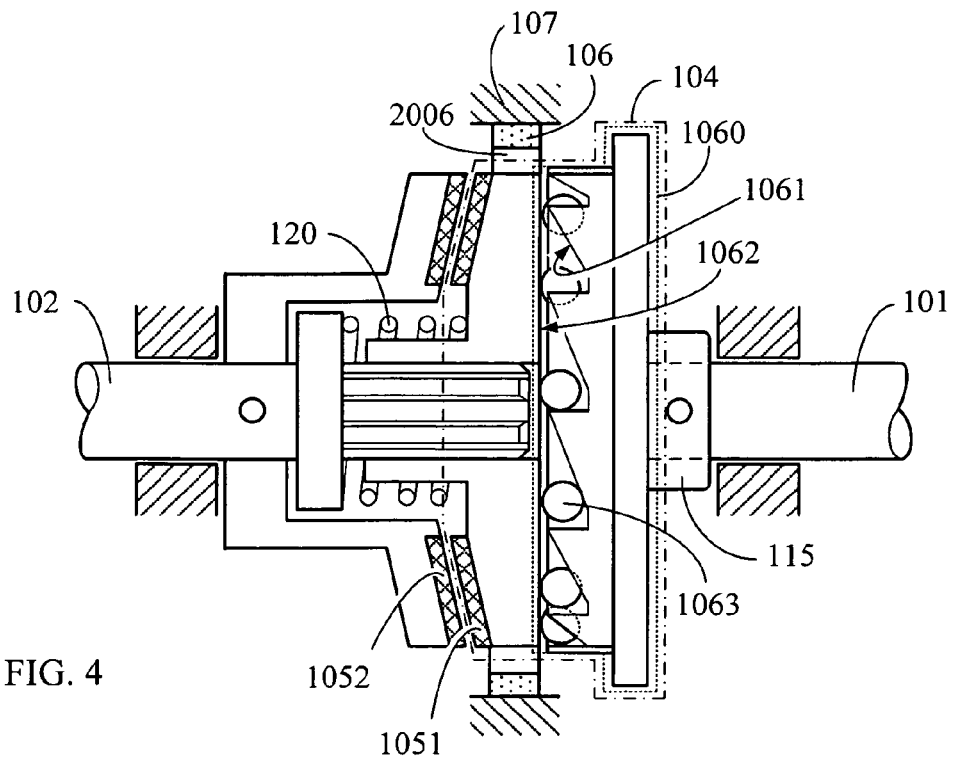
FIG. 4 is a schematic structural view of one embodiment illustrating that the relay coupling structure installed in the relay transmission structure assembly (104) is composed by the axial compelling over running clutch.

As shown in FIG. 3, it main consists of:

a prime motive end (101): composed by a rotational mechanism for inputting the rotary kinetic energy; the prime motive end (101) is a coil-shaped spring capable of rotating for axial actuation (1043) for driving the relay transmission structure assembly (104), the prime motive end (101) is installed with a limiting structure (115) for limiting relative positions of the relay transmission structure assembly (104) and the prime motive end (101);

an output end (102): composed by a rotational mechanism for outputting the rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), and is capable of performing rotational driving and axial movements, the relay transmission structure assembly (104) is installed with a coil-shaped spring capable of rotating for axial actuation (1043) serving to provide the relay coupling structure function and is coaxially shaft-installed between the relay transmission structure assembly (104) and the prime motive end (101), one end of the coil-shaped spring capable of rotating for axial actuation (1043) is fastened at the prime motive end (101) for providing the function of the active side of relay coupling structure, the other end of the coil-shaped spring capable of rotating for axial actuation (1043) is installed in the relay transmission structure assembly (104) for providing the function of the passive side of relay coupling structure, a centrifugal force cutting type centrifugal clutch (2006) and a limit-torque sliding damping device (106) are installed between the relay transmission structure assembly (104) and the static housing (107); when the coil-shaped spring capable of rotating for axial actuation (1043) is processed with a tighten operation of angle displacement driving by the prime motive end (101), through a sliding damping effect generated by the centrifugal force cutting type centrifugal clutch (2006) being in an engaged state and the limit-torque sliding damping device (106) installed between the relay transmission structure assembly (104) and the static housing (107), the coil-shaped spring capable of rotating for axial actuation (1043) generates an axial actuation force for the relay transmission structure assembly (104) to generate a relative axial movement, such that the relay output clutch structure (1051) installed in the relay transmission structure assembly (104) is driven to perform closing/opening operations with the output-end clutch structure (1052) so as to transmit the rotary kinetic energy and to force the recovering actuation spring (120) being tightened, and when reaching a set rotational speed, the centrifugal force cutting type centrifugal clutch (2006) cuts the connection between the relay transmission structure assembly (104) and the static housing (107); meanwhile through the driving torque from the prime motive end (101) to the output end (102), the passive side of relay output coupling structure is continuously driven by the active side of relay coupling structure, so the relay transmission structure assembly (104) and the relay output clutch structure (1051) installed in the relay transmission structure assembly (104) are driven to perform closing/opening operations with the output-end clutch structure (1052) installed at the output end (102) so as to transmit the rotary kinetic energy and to force the recovering actuation spring (120) provided between the relay output clutch structure (1051) and the output-end clutch structure (1052) being tightened;

when the rotational driving torque form the prime motive end (101) to the output end (102) is no longer provided, through the releasing recovering force of the recovering actuation spring (120) the relay output clutch structure (1051) and the output-end clutch structure (1052) are disengaged and the coil-shaped spring capable of rotating for axial actuation (1043) is returned, thereby terminating the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107), and is installed between the centrifugal force cutting type centrifugal clutch (2006) and the static housing (107); when the coil-shaped spring capable of rotating for axial actuation (1043) is applied with an angular displacement driving force of tightening operations by the prime motive end (101), through actions of the limit-torque sliding damping device (106), relative movements are generated in the relay transmission structure assembly (104);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force cutting type centrifugal clutch (2006): configured by a device having limit-torque damping function and being controlled by the centrifugal force to be in a cut state while reaching a set rotational speed and be in an engaged state while being static or in low speed so as to restrain the rotational motion between the relay transmission structure assembly (104) and the static housing (107), and is installed between the relay transmission structure assembly (104) and the limit-torque sliding damping device (106), when the coil-shaped spring capable of rotating for axial actuation (1043) is applied with a tightening angular displacement driving force by the prime motive end (101), with a sliding damping effect generated through the centrifugal force cutting type centrifugal clutch (2006) being combined with the limit-torque sliding damping device (106), the relay transmission structure assembly (104) generates a relative movement;

a static housing (107): configured by a static housing structure for accommodating the centrifugal force cutting off sliding damping type torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

relay output clutch structure (1051): the relay output clutch structure (1051) is composed by a clutch function structure and is installed in the relay transmission structure assembly (104), when the coil-shaped spring capable of rotating for axial actuation (1043) is driven by the prime motive end (101), the relay output clutch structure (1051) and the relay transmission structure assembly (104) are driven by the coil-shaped spring capable of rotating for axial actuation (1043) having the relay coupling structure function and installed between the relay transmission structure assembly (104) and the prime motive end (101), so as to perform closing/opening operations with the output-end clutch structure (1052) for transmitting the rotary kinetic energy and forcing the recovering actuation spring (120) being tightened; when the rotational driving torque from the prime motive end (101) to the output end (102) is no longer provided, the relay output clutch structure (1051) and the output-end clutch structure (1052) are disengaged and the coil-shaped spring capable of rotating for axial actuation (1043) is returned through the releasing recovering force of the recovering actuation spring (120), thereby further terminating the transmission of the rotary kinetic energy;

an out-put end clutch structure (1052): composed by a clutch function structure capable of performing closing/opening operations with the relay output clutch structure (1051) to transmit rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force cutting off sliding damping type torque-actuated clutch of the present invention, the relay coupling structure installed in the relay transmission structure assembly (104) can be further composed by an axial compelling over running clutch;

FIG. 4 is a schematic structural view of one embodiment illustrating that the relay coupling structure installed in the relay transmission structure assembly (104) is composed by the axial compelling over running clutch.

As shown in FIG. 4, it mainly consists of:
a prime motive end (101): composed by a rotational mechanism for inputting the rotary kinetic energy; the prime motive end (101) is an active side of axial compelling over running clutch (1061), having the function of active side of relay input coupling structure, for driving the relay transmission structure assembly (104), the prime motive end (101) is installed with a limiting structure (115) for limiting relative positions of the relay transmission structure assembly (104) and the prime motive end (101);

an output end (102): composed by a rotational mechanism for outputting the rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), the relay transmission structure assembly (104) is installed with an axial compelling over running clutch (1060) having the function of relay coupling structure, the axial compelling over running clutch (1060) has an active side of axial compelling over running clutch (1061) and a passive side of axial compelling over running clutch (1062) and middle rolling members (1063), a plurality of saw-shaped intervals are formed between the active side of axial compelling over running clutch (1061) and the passive side of axial compelling over running clutch (1062) for accommodating the middle rolling members (1063) so as to constitute the over running clutch function; a centrifugal force cutting type centrifugal clutch (2006) and a limit-torque sliding damping device (106) are installed between the relay transmission structure assembly (104) and the static housing (107), when the axial compelling over running clutch (1060) is driven by the prime motive end (101), through a sliding damping effect generated by the centrifugal force cutting type centrifugal clutch (2006) being in an engaged state and the limit-torque sliding damping device (106) installed between the relay transmission structure assembly (104) and the static housing (107), the active side of axial compelling over running clutch (1061) applies rotational driving torque to the passive side of axial compelling over running clutch (1062) via the middle running members (1063); before the middle rolling members (1063) are forced to be latched between the active side of axial compelling over running clutch (1061) and the passive side of axial compelling over running clutch (1062), the passive side of axial compelling over running clutch (1062) is compelled to be axially moved, so the relay transmission structure assembly (104) installed with the axial compelling over running clutch (1060) generates a relative movement for driving the relay output clutch structure (1051) installed in the relay transmission structure assembly (104) to perform opening/closing operations with the output-end clutch structure (1052) so as to transmit the rotary kinetic energy and to force the recovering actuation spring (120) being tightened, and when reaching a set rotational speed, the centrifugal force cutting type centrifugal clutch (2006) cuts the connection between the relay transmission structure assembly (104) and the static housing (107); meanwhile through the driving torque from the prime motive end (101) to the output end (102), the passive side of relay output coupling structure is continuously driven by the active side of relay coupling structure, so the relay transmission structure assembly (104) and the relay output clutch structure (1051) installed in the relay transmission structure assembly (104) are driven to perform closing/opening operations with the output-end clutch structure (1052) installed at the output end (102) so as to transmit the rotary kinetic energy and to force the recovering actuation spring (120) provided between the relay output clutch structure (1051) and the output-end clutch structure (1052) being tightened;

when the rotational driving torque from the prime motive end (101) to the output end (102) is no longer provided, through the releasing recovering force of the recovering actuation spring (120) the relay output clutch structure (1051) and the output-end clutch structure (1052) are disengaged and the passive side of axial compelling over running clutch (1062) is returned, thereby terminating the transmission of the rotary kinetic energy;

a limit-torque sliding damping device (106): composed by a mechanism device having limit-torque sliding damping effect with a restraining function while relative rotational movements are generated between the relay transmission structure assembly (104) and the static housing (107), and is installed between the centrifugal force cutting type centrifugal clutch (2006) and the static housing (107); when the active side of axial compelling over running clutch (1061) is rotationally driven by the prime motive end (101), through actions of the limit-torque sliding damping device (106), relative movements are generated between the active side of axial compelling over running clutch (1061) and the passive side of axial compelling over running clutch (1062);

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force cutting type centrifugal clutch (2006): configured by a device having limit-torque damping function and being controlled by the centrifugal force to be in a cut state while reaching a set rotational speed and be in an engaged state while being static or in low speed so as to restrain the rotational motion between the relay transmission structure assembly (104) and the static housing (107), and is installed between the relay transmission structure assembly (104) and the limit-torque sliding damping device (106), when the active side of axial compelling over running clutch (1061) is driven by the prime motive end (101) to perform rotational driving, with a sliding damping effect of the limit-torque sliding damping device (106) being combined with the centrifugal force cutting type centrifugal clutch (2006), a relative movement is generated between the active side of axial compelling over running clutch (1061) and the passive side of axial compelling over running clutch (1062);

a static housing (107): configured by a static housing structure for accommodating the centrifugal force cutting off sliding damping type torque-actuated clutch;

a limiting structure (115): composed by a mechanism capable of limiting relative positions of the relay transmission structure assembly (104) and the prime motive end (101), and is combined with the rotary part of the prime motive end (101);

a recovering actuation spring (120): which is a spring device capable of being pressed for storing energy and being released for outputting energy, and is disposed between the relay output clutch structure (1051) and the output-end clutch structure (1052), and the normal state thereof is to separate the relay output clutch structure (1051) and the output-end clutch structure (1052), so as to terminate the transmission of the rotary kinetic energy; when the relay output clutch structure (1051) and the output-end clutch structure (1052) are driven so as to be engaged, the recovering actuation spring (120) is synchronously pre-pressed for being in an energy-storing state;

a relay output clutch structure (1051): the relay output clutch structure (1051) is composed by a clutch function structure and is installed in the relay transmission structure assembly (104), when the active side of axial compelling over running clutch (1061) is driven by the prime motive end (101), the passive side of axial compelling over running clutch (1062) installed in the relay transmission structure assembly (104) is axially driven so as to drive the relay transmission structure assembly (104) and the relay output clutch structure (1051) installed in the relay transmission structure assembly (104) for performing opening/closing operations with the output-end clutch structure (1052) to transfer the rotary kinetic energy and force the recovering actuation spring (120) being tightened; when the rotational driving torque from the prime motive end (101) to the output end (102) is no longer provided, through the releasing recovering force of the recovering actuation spring (120), the relay output clutch structure (1051) and the output-end clutch structure (1052) are disengaged and the passive side of axial compelling over running clutch (1062) is returned, thereby further terminating the transmission of the rotary kinetic energy;

an out-put end clutch structure (1052): composed by a clutch function structure capable of performing closing/opening operations with the relay output clutch structure (1051) to transmit the rotary kinetic energy, or being disengaged for terminating the transmission of the rotary kinetic energy, and the output-end clutch structure (1052) is connected to the output end (102);

the clutch structure of the relay output clutch structure (1051) and the output-end clutch structure (1052) consists of the friction-type clutch structure, the engaging-type clutch structure or the synchro-engaging clutch structure;

In the centrifugal force cutting off sliding damping type torque-actuated clutch of the present invention, wherein the relay coupling structure installed in the relay transmission structure assembly (104) can be further composed by an axial relay clutch of the axial clutch transmission block having axial compelling pre-forced recovering.

Figure 5:
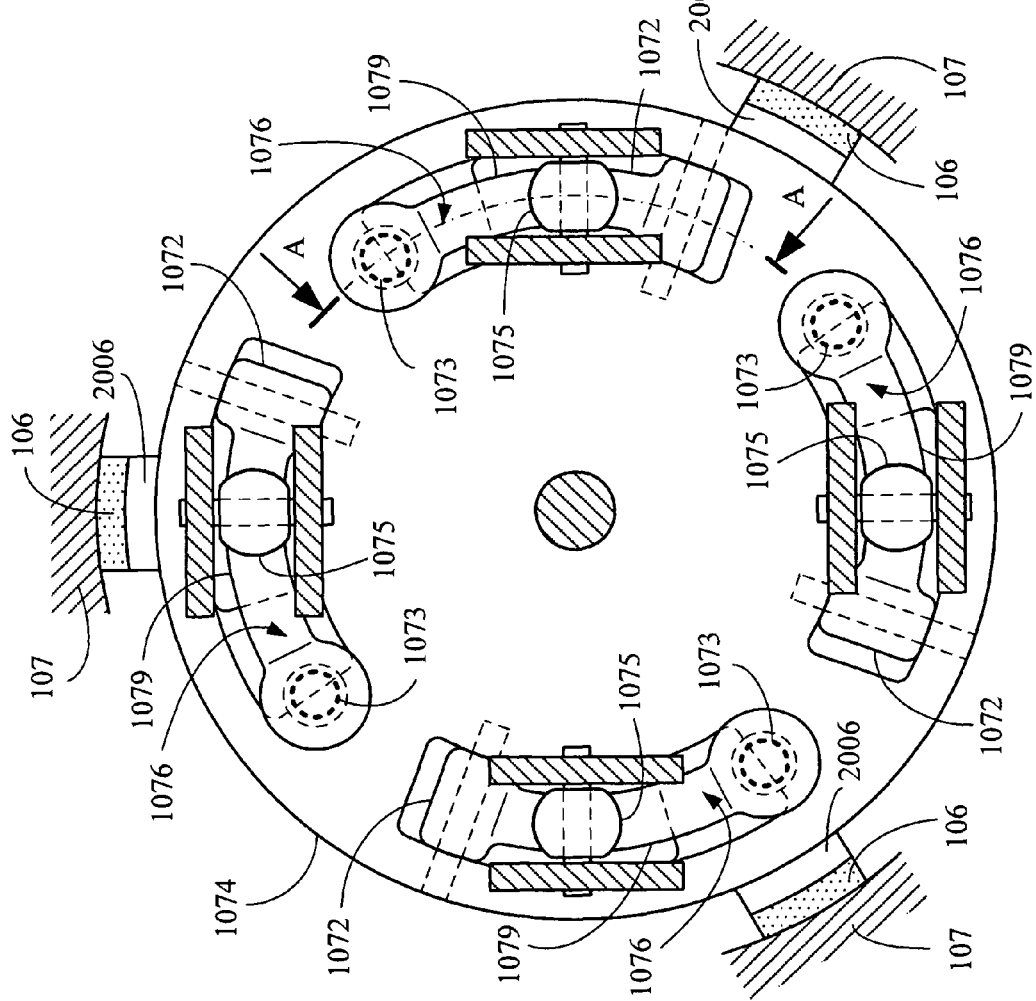
FIG. 5 is a structural schematic view of one embodiment illustrating that the relay coupling structure installed in the relay transmission structure assembly (104) is composed by the axial relay clutch of the axial clutch transmission block having axial compelling pre-forced recovering.

FIG. 5 is a structural schematic view of one embodiment illustrating that the relay coupling structure installed in the relay transmission structure assembly (104) is composed by the axial relay clutch of the axial clutch transmission block having axial compelling pre-forced recovering.

Figure 6:
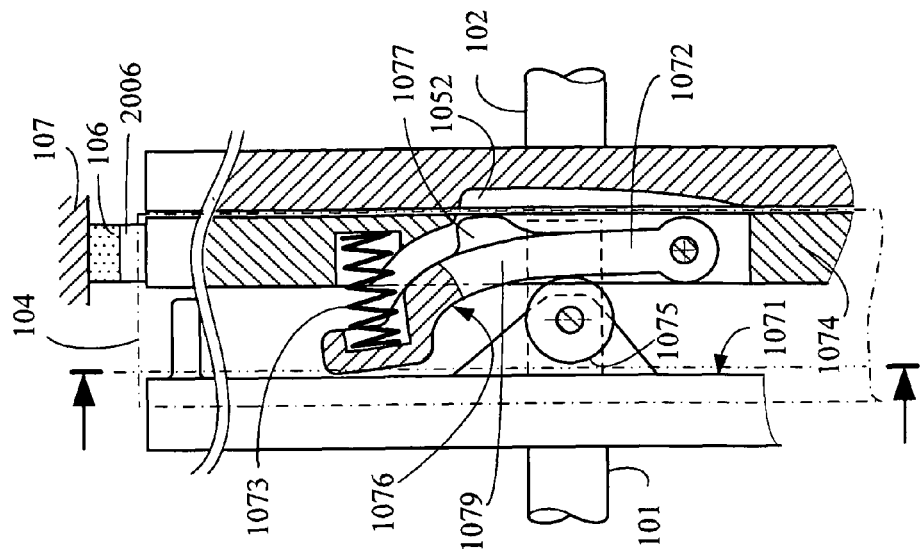
FIG. 6 is a cross sectional view of FIG. 5 intersected along an A-A line.

As shown in FIG. 5, it mainly consists of:

a prime motive end (101): composed by a rotational mechanism for inputting the rotary kinetic energy; the prime motive end (101) is an axial relay clutch, constituting the function of relay coupling structure, for driving the relay transmission structure assembly (104);

an output end (102): composed by a rotational mechanism for outputting the rotary kinetic energy; the output end (102) is connected to an output-end clutch structure (1052), and is controlled by the output-end clutch structure (1052);

a relay transmission structure assembly (104): the relay transmission structure assembly (104) is installed between the prime motive end (101) and the output end (102), the relay transmission structure assembly (104) is equipped with an axial relay clutch which mainly consists of an active side of axial relay clutch (1071), an axial clutch transmission block (1072), an axial clutch transmission block recovering spring (1073), an axial relay clutch transmission board (1074), and a middle rolling member (1075); wherein the active side of axial relay clutch (1071) accommodating the middle rolling member (1075) is driven by the prime motive end (101), the middle rolling member (1075) is coupled to a passive side of axial relay clutch (1076) which is an obliquely compelled surface with respect to the axial clutch transmission block (1072), the axial clutch transmission block (1072) is installed on the axial relay clutch transmission board (1074), a centrifugal force cutting type centrifugal clutch (2006) and a limit-torque sliding damping device (106) are installed between the axial relay clutch transmission board (1074) and the static housing (107), one end of the axial clutch transmission block (1072) is fastened on the axial relay clutch transmission board (1074), the other end of the axial clutch transmission block (1072) is served as a transmission end (1079), the passive side of axial relay clutch (1076) of the transmission end (1079) is an obliquely compelled surface allowing the middle rolling member (1075) to be coupled, the other surface of the transmission end (1079) is served as an axial clutch structure (1077), when the active side of axial relay clutch (1071) equipped with the middle rolling member (1075) is applied with the rotational driving torque by the prime motive end (101) and thereby linking the axial relay clutch transmission board (1074), through a sliding damping effect generated by the centrifugal force cutting type centrifugal clutch (2006) being in an engaged state and the limit-torque sliding damping device (106) installed between the relay transmission structure assembly (104) and the static housing (107), the passive side of axial relay clutch (1076) which is an obliquely compelled surface with respect to the axial clutch transmission block (1072) is compelled to move by the middle rolling member (1075) installed at the active side of axial relay clutch (1071), and the axial clutch structure (1077) is moved to be coupled with the output-end clutch structure (1052) of the output end (102) for transferring the rotary kinetic energy, and when reaching a set rotational speed, the centrifugal force cutting type centrifugal clutch (2006) cuts the connection between the relay transmission structure assembly (104) and the static housing (107); meanwhile, through the driving torque from the prime motive end (101) to the output end (102), the passive side of relay output coupling structure is continuously driven by the active side of relay coupling structure, so the relay transmission structure assembly (104) and the axial clutch structure (1077) installed in the relay transmission structure assembly (104) are driven to perform closing/opening operations with the output-end clutch structure (1052) installed at the output end (102) so as to transmit the rotary kinetic energy and to force the axial clutch transmission block recovering spring (1073) provided between the transmission end (1079) and the output-end clutch structure (1052) being tightened;

when the rotational driving torque from the prime motive end (101) to the output end (102) is no longer provided, through the elasticity of the axial clutch transmission block (1072) and/or the releasing recovering force of the axial clutch transmission block recovering spring (1073) installed between the axial relay clutch transmission board (1074) and the middle rolling member (1075), such that the axial clutch structure (1077) of the axial clutch transmission block (1072) and the output-end clutch structure (1052) of the output end (102) are disengaged, and the axial relay clutch transmission board (1074) is returned, thereby terminating the transmission of the rotary kinetic energy;

a limit-torque sliding damping device (106): composed by a mechanism device having limit-torque sliding damping effect with a restraining function while relative rotational movements are generated between the axial relay clutch transmission board (1074) and the static housing (107), and is installed between the static housing (107) and the axial relay clutch transmission board (1074), when the active side of axial relay clutch (1071) is rotationally driven by the prime motive end (101), through actions of the limit-torque sliding damping device (106), the active side of axial relay clutch (1071) performs rotationally driving to the axial relay clutch transmission board (1074), the axial clutch transmission block (1072) and the axial clutch structure (1077) of the axial relay clutch transmission board (1074) are compelled to move by the middle rolling member (1075) driven by the active side of axial relay clutch (1071) to generate a relative movement;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force cutting type centrifugal clutch (2006): configured by a device having limit-torque damping function and being controlled by the centrifugal force to be in a cut state while reaching a set rotational speed and be in an engaged state while being static or in low speed so as to restrain the rotational motion between the axial relay clutch transmission board (1074) and the static housing (107), and is installed between the axial relay clutch transmission board (1074) and the limit-torque sliding damping device (106), when the active side of axial relay clutch (1071) is rotationally driven by the prime motive end (101), with a sliding damping effect of the limit-torque sliding damping device (106) being combined with the centrifugal force cutting type centrifugal clutch (2006), the middle rolling member (1075) driven by the active side of axial relay clutch (1071) compels the axial clutch transmission block (1072) of the axial relay clutch transmission board (1074) and the axial clutch structure (1077) to generate a relative movement while the active side of axial relay clutch (1071) performs rotationally driving to the axial relay clutch transmission board (1074);

a static housing (107): configured by a static housing structure for accommodating the centrifugal force cutting off sliding damping type torque-actuated clutch;

an output-end clutch structure (1052): the output-end clutch structure (1052) is composed by a clutch function structure and is connected to the output end (102) to be served to perform opening/closing operations with the axial clutch structure (1077) of the transmission end (1079) of the axial clutch transmission block (1072) of the axial relay clutch transmission board (1074) for transferring the rotary kinetic energy, or in a disengaged state for terminating the transmission of the rotary kinetic energy;

the clutch structure of the axial clutch structure (1077) and the output-end clutch structure (1052) consists of the friction-type clutch structure, the engaging-type clutch structure or the synchro-engaging clutch structure;

a middle rolling member (1075): which can be replaced by rolling balls, cone-shaped cylinders, or spherical or arc-shaped protrusions;

In the centrifugal force cutting off sliding damping type torque-actuated clutch of the present invention, the relay output coupling structure installed in the relay transmission structure assembly (104) can be further composed by a radial relay clutch of the radial clutch transmission block having radial compelling pre-forced recovering;

FIG. 6 is a cross sectional view of FIG. 5 intersected along an A-A line.

Figure 7:
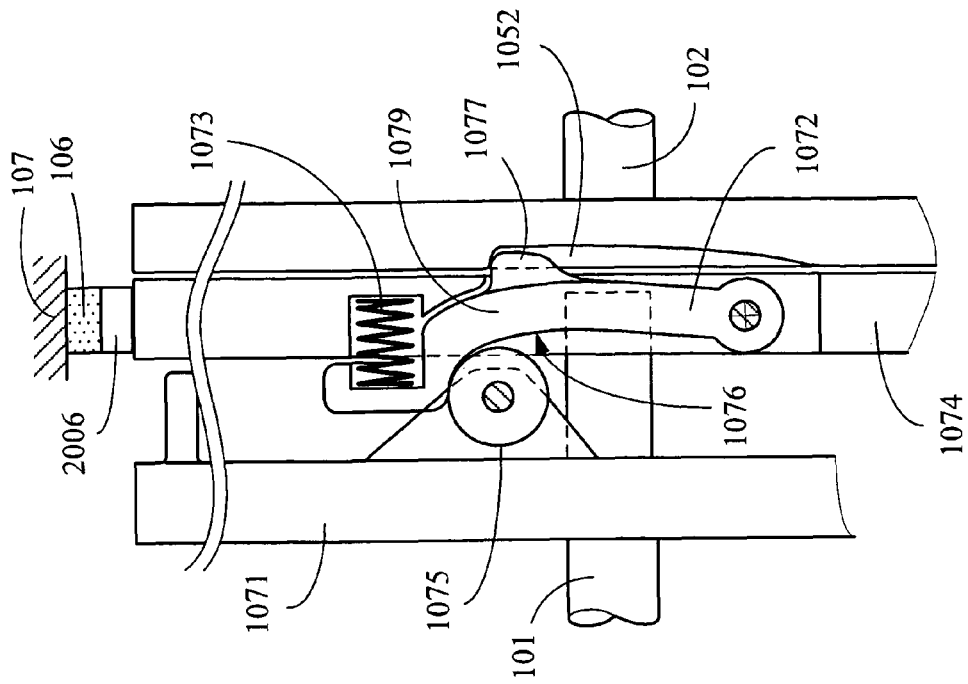
FIG. 7 is a schematic view illustrating the disengaged state of the axial clutch structure (1077) and the output-end clutch structure (1052) as shown in FIG. 5.

FIG. 7 is a schematic view illustrating the disengaged state of the axial clutch structure (1077) and the output-end clutch structure (1052) as shown in FIG. 5.

Figure 8:
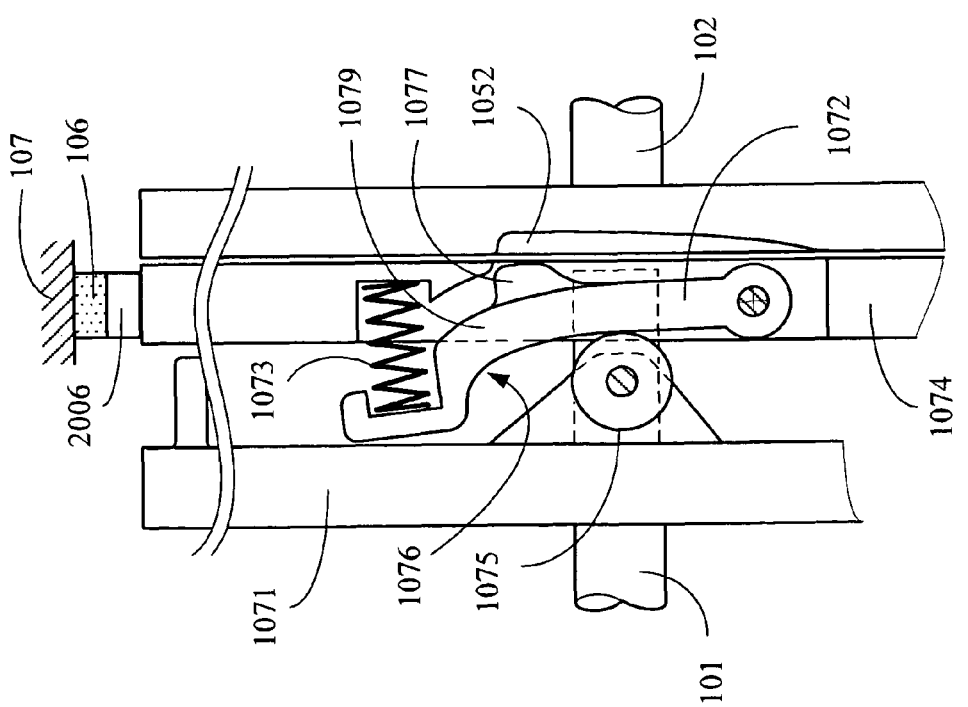
FIG. 8 is a schematic view illustrating the engaged state of the axial clutch structure (1077) and the output-end clutch structure (1052) as shown in FIG. 5.

FIG. 8 is a schematic view illustrating the engaged state of the axial clutch structure (1077) and the output-end clutch structure (1052) as shown in FIG. 5.

Figure 9:
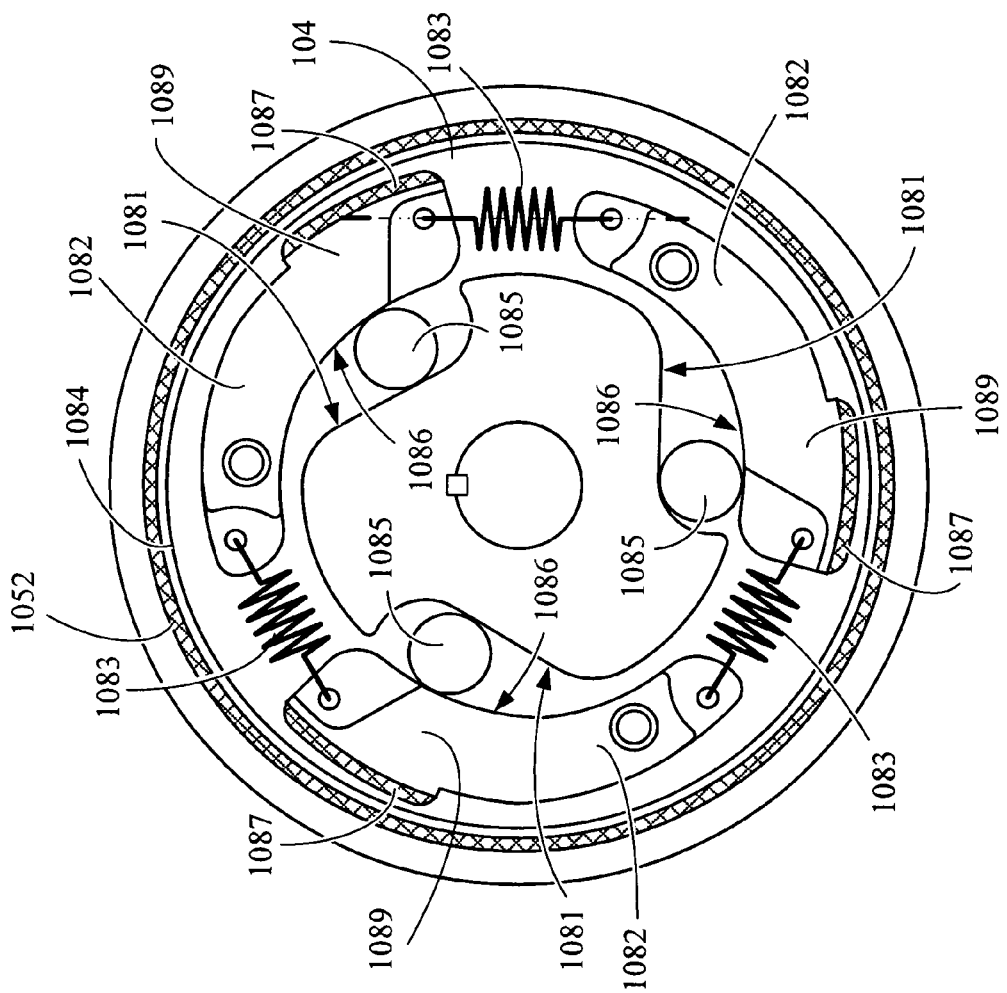
FIG. 9 is a schematic structural view of one embodiment illustrating that the relay coupling structure and the relay outputting structure installed in the relay transmission structure assembly (104) are composed by the radial relay clutch of the radial clutch transmission block having radial compelling pre-forced recovering.

FIG. 9 is a schematic structural view of one embodiment illustrating that the relay coupling structure and the relay outputting structure installed in the relay transmission structure assembly (104) are composed by the radial relay clutch of the radial clutch transmission block having radial compelling pre-forced recovering.

Figure 10:
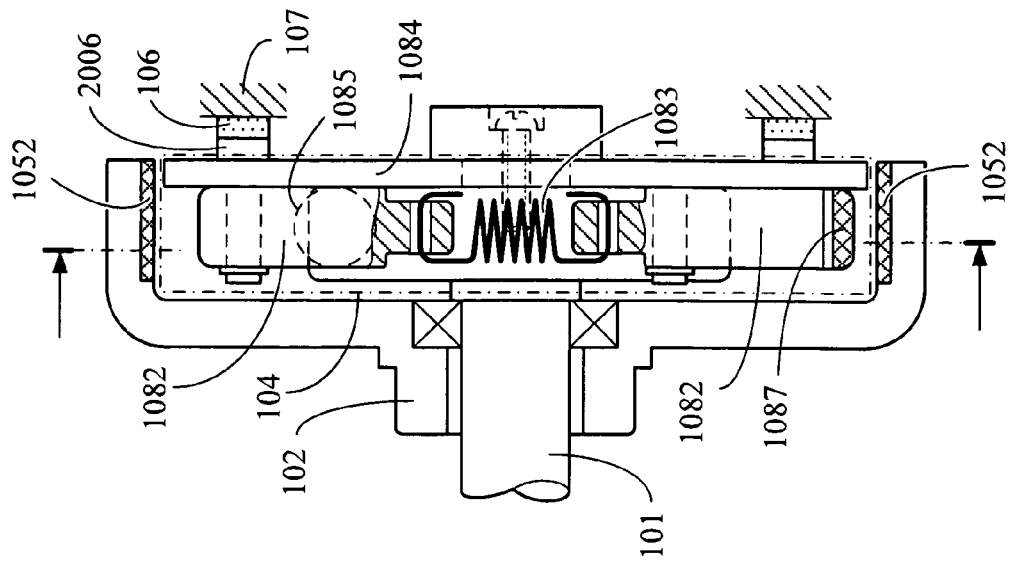
FIG. 10 is a cross sectional view of FIG. 9.

As shown in FIG. 9, it mainly consists of:

a prime motive end (101): composed by a rotational mechanism for inputting the rotary kinetic energy; the prime motive end (101) is a radial relay clutch, constituting the function of relay coupling structure, for driving the relay transmission structure assembly (104);

an output end (102): composed by a rotational mechanism for outputting the rotary kinetic energy; the annular interior of the output end (102) is installed with an output-end clutch structure (1052), and is controlled by the output-end clutch structure (1052);

a relay transmission structure assembly (104): the relay transmission structure assembly (104) is installed between the prime motive end (101) and the output end (102), the three components are arranged as a concentric annular structure, the relay transmission structure assembly (104) has a radial relay clutch which mainly consists of an active side of radial relay clutch (1081), a radial clutch transmission block (1082), a radial clutch transmission block recovering spring (1083), a radial relay clutch transmission board (1084), and a middle rolling member (1085); wherein the active side of radial relay clutch (1081) accommodating the middle rolling member (1085) is driven by the prime motive end (101), the middle rolling member (1085) is coupled to a passive side of radial relay clutch (1086) which is an obliquely compelled surface with respect to the radial clutch transmission block (1082), the radial clutch transmission block (1082) is installed on the radial relay clutch transmission board (1084), a centrifugal force cutting type centrifugal clutch (2006) and a limit-torque sliding damping device (106) are installed between the radial relay clutch transmission board (1084) and the static housing (107), one end of the radial clutch transmission block (1082) is fastened on the radial relay clutch transmission board (1084), the other end of the radial clutch transmission block (1082) is served as a transmission end (1089), the passive side of radial relay clutch (1086) of the transmission end (1089) is an obliquely compelled surface allowing the middle rolling member (1085) to be coupled, and the other surface of the transmission end (1089) is served as a radial clutch structure (1087), when the active side of radial relay clutch (1081) equipped with the middle rolling member (1085) is applied with the rotational driving torque by the prime motive end (101) and thereby linking the radial relay clutch transmission board (1084), through a sliding damping effect generated by the centrifugal force cutting type centrifugal clutch (2006) being in an engaged state and the limit-torque sliding damping device (106) installed between the relay transmission structure assembly (104) and the static housing (107), the passive side of radial relay clutch (1086) which is an obliquely compelled surface with respect to the radial clutch transmission block (1082) is compelled to move by the middle rolling member (1085) installed at the active side of radial relay clutch (1081), and the radial clutch structure (1087) is moved to be coupled with the output-end clutch structure (1052) of the output end (102) for transferring the rotary kinetic energy, and when reaching a set rotational speed, the centrifugal force cutting type centrifugal clutch (2006) cuts the connection between the relay transmission structure assembly (104) and the static housing (107); meanwhile, through the driving torque from the prime motive end (101) to the output end (102), the passive side of relay output coupling structure is continuously driven by the active side of relay coupling structure, so the relay transmission structure assembly (104) and the radial clutch structure (1087) installed in the relay transmission structure assembly (104) are driven to perform closing/opening operations with the output-end clutch structure (1052) installed at the output end (102) so as to transmit the rotary kinetic energy and to force the radial clutch transmission block recovering spring (1083) provided between the transmission end (1089) and the output-end clutch structure (1052) being tightened;

when the rotational driving torque from the prime motive end (101) to the output end (102) is no longer provided, through the elasticity of the radial clutch transmission block (1082) and/or the releasing recovering force of the radial clutch transmission block recovering spring (1083) installed between the radial relay clutch transmission board (1084) and the middle rolling member (1085), such that the radial clutch structure (1087) of the radial clutch transmission block (1082) and the output-end clutch structure (1052) of the output end (102) are disengaged, and the radial relay clutch transmission board (1084) is returned, thereby terminating the transmission of the rotary kinetic energy;

a limit-torque sliding damping device (106): composed by a mechanism device having limit-torque sliding damping effect with a restraining function while relative rotational movements are generated between the radial relay clutch transmission board (1084) and the static housing (107), and is installed between the static housing (107) and the radial relay clutch transmission board (1084), when the active side of radial relay clutch (1081) is rotationally driven by the prime motive end (101), through actions of the limit-torque sliding damping device (106), the active side of radial relay clutch (1081) performs rotationally driving to the radial relay clutch transmission board (1084), the radial clutch transmission block (1082) and the radial clutch structure (1087) of the radial relay clutch transmission board (1084) are compelled to move by the middle rolling member (1085) driven by the active side of radial relay clutch (1081) to generate a relative movement;

the structure includes: constituted by the mechanism device, which is through the mechanical force, the spring pre-stressing force, the electromagnetic force of electric excited coil, or the action force of permanent magnet for the limit-torque sliding damping device (106) including between solid and solid, or between solid and viscous fluid, or between viscous fluid and viscous fluid, or between solid and gaseous or liquidity fluids to generate sliding damping;

centrifugal force cutting type centrifugal clutch (2006): configured by a device having limit-torque damping function and being controlled by centrifugal force to be in a cut state while reaching a set rotational speed and be in an engaged state while being static or in low speed so as to restrain the rotational motion between the radial relay clutch transmission board (1084) and the static housing (107), and is installed between the radial relay clutch transmission board (1084) and the limit-torque sliding damping device (106), when the active side of radial relay clutch (1081) is rotationally driven by the prime motive end (101), with a sliding damping effect of the limit-torque sliding damping device (106) being combined with the centrifugal force cutting type centrifugal clutch (2006), the middle rolling member (1085) driven by the active side of radial relay clutch (1081) compels the radial clutch transmission block (1082) of the radial relay clutch transmission board (1084) and the radial clutch structure (1087) to generate a relative movement while the active side of radial relay clutch (1081) performs rotationally driving to the radial relay clutch transmission board (1084);

a static housing (107): configured by a static housing structure for accommodating the centrifugal force cutting off sliding damping type torque-actuated clutch;

an output-end clutch structure (1052): the output-end clutch structure (1052) is composed by a clutch function structure and is connected to the output end (102) to be served to perform opening/closing operations with the radial clutch structure (1087) of the transmission end (1089) of the radial clutch transmission block (1082) of the radial relay clutch transmission board (1084) for transferring rotation kinetic energy, or in a disengaged state for terminating the transmission of the rotary kinetic energy;

the clutch structure of the radial clutch structure (1087) and the output-end clutch structure (1052) consists of the friction-type clutch structure, the engaging-type clutch structure or the synchro-engaging clutch structure;

a middle rolling member (1085): which can be replaced by rolling balls, cone-shaped cylinders, or spherical or arc-shaped protrusions;

FIG. 10 is a cross sectional view of FIG. 9.

For the centrifugal force cutting off sliding damping type torque-actuated clutch of the present invention, it can be composed by two sets of centrifugal force cutting off sliding damping type torque-actuated clutches and having the same prime motive end (101), including:

1. two sets of centrifugal force cutting off sliding damping type clutches actuated by torque both transmitting in the axial direction, having different operation directions and having the same prime motive end (101);

2. two sets of centrifugal force cutting off sliding damping type clutches actuated by torque both transmitting in the axial direction, having the same operation direction and having the same prime motive end (101);

3. two sets of centrifugal force cutting off sliding damping type clutches actuated by torque both transmitting in the radial direction, having different operation directions and having the same prime motive end (101);

4. two sets of centrifugal force cutting off sliding damping type clutches actuated by torque both transmitting in the radial direction, having the same operation direction and having the same prime motive end (101);

5. two sets of centrifugal force cutting off sliding damping type clutches actuated by torque in which one set transmitting in the radial direction and the other transmitting in the axial direction, having different operation directions and having the same prime motive end (101);

6. two sets of centrifugal force cutting off sliding damping type clutches actuated by torque in which one set transmitting in the radial direction and the other transmitting in the axial direction, having the same operation direction and having the same prime motive end (101).

The invention claimed is:

1. A clutch device, comprising:
a relay transmission structure assembly (104) including a relay coupling structure (204) having a passive side including a relay output clutch structure (1051,1087) arranged to engage an output-end clutch structure (1052) connected to an output end (102) when an active side of the relay coupling structure (204) is actuated by a prime motive end (101);
a static housing (107); and
a damping device including a clutch (2006) and a torque-limiting element (106) installed between the passive side of the relay coupling structure and the static housing (107), said clutch (2006) interacting with the torque-limiting element (106) to produce a torque-limiting force when passive side rotation speed is below a predetermined speed, and said clutch (2006) cutting off interaction with the torque-limiting element when the passive side rotation speed exceeds the predetermined speed; and
wherein the clutch (2006) interacts with the torque-limiting element (106) upon rotation of said prime motive end to initially impede movement of the passive side of the relay coupling structure (204), thereby causing the active side of the relay coupling structure (204) to move relative to the passive side and said relay output clutch structure (1051, 1087) to engage said output end clutch structure (1052), said clutch (2006) ceasing to interact with the torque-limiting element (106) when the passive side of the relay coupling structure (204) has reached a predetermined speed to cut a connection between the relay transmission structure assembly (104) and the limit-torque sliding damping device (106).

2. A clutch device as recited in claim 1, further comprising a limiting structure (115) for limiting movement of the active side of the relay transmission structure assembly (104) away from the output end (102).

3. A clutch device as recited in claim 1, wherein the torque-limiting element (106) and clutch (2006) interact by one of a mechanical force, spring pre-stressing force, electromagnetic force, and magnetic force acting between solid materials, a solid and a viscous fluid, viscous fluids, or between a solid and a gas or liquid, to generate a sliding damping force.

4. A clutch device as recited in claim 1, wherein the relay output clutch structure (1051) and output end clutch structure form one of a friction-type clutch structure, engaging-type clutch structure, and synchronously engaging-type clutch structure.

5. A clutch device as recited in claim 1, further comprising a recovery actuation spring (120) provided between the relay output clutch structure (1051) and the output-end clutch structure (1052) to cause said relay output clutch structure (1051) to release said output end clutch structure (1052) when the prime motive end (101) no longer drives the active side of the relay output coupling structure (204).

6. A clutch device as recited in claim 5, wherein said relay output coupling structure (204) includes a screw rod structure (1041) on the active side and a screw nut structure (1042) on the passive side.

7. A clutch device as recited in claim 5, wherein said relay output coupling structure (204) includes a coil spring (1043) that axially drives the passive side of the relay output coupling structure (204) when the active side of the relay output coupling structure is driven by the prime motive end (101).

8. A clutch device as recited in claim 5, wherein the relay transmission structure assembly (104) is an axial compelling over-running clutch (1060) that includes the active side (1061) of the relay coupling structure (204), the passive side (1062) of the relay coupling structure (204), and middle rolling members (1063), wherein a plurality of saw-shaped intervals are formed between the active side (1061) and the passive side (1062) for accommodating the middle rolling members (1063) so as to provide an over-running clutch function.

9. A clutch device as recited in claim 1, wherein the relay coupling structure (204) is an axial relay clutch assembly for actuating an axial relay clutch (1076), said relay clutch assembly including an axial clutch transmission block recovering spring (1073), an axial relay clutch transmission board (1074), and a middle rolling member (1075), wherein the active side (1071) of the axial relay clutch assembly accommodates the middle rolling member (1075), the middle rolling member (1075) being coupled to the passive side of the axial relay clutch (1076) and arranged to engage an oblique surface of the axial clutch transmission block (1072) to cause the axial relay clutch to pivot against the axial clutch transmission block recovering spring (1073) when the middle rolling member (1075) is driven by the prime motive end (101), pivoting of the axial relay clutch (1076) causing the relay output clutch structure (1051) on the axial clutch transmission block to engage the output-end clutch structure (1052).

10. A clutch device as recited in claim 1, wherein the relay transmission structure assembly (104), the prime motive end (101), and output end (102) are arranged as a concentric annular structure with the relay transmission structure assembly (104) being installed between the prime motive end (101) and the output end (102), and wherein the relay coupling structure (204) is a radial relay clutch assembly for actuating a radial relay clutch (1086), the relay clutch assembly including at least one radial clutch transmission block recovering spring (1083), at least one radial relay clutch transmission board (1084), and at least one middle rolling member (1085), wherein the active side (1081) of the relay coupling structure (204) accommodates the middle rolling member (1085) and is shaped to cause radial movement of the middle rolling member (1085) when the active side (1081) of the relay coupling structure (204) is rotated by the prime motive end (101, the middle rolling member (1085) being coupled to the passive side of the radial relay clutch (1086) and arranged to engage an oblique surface of the radial clutch transmission block (1082) to cause the radial relay clutch to pivot against the radial clutch transmission block recovering spring (1083) when the middle rolling member (1085) is driven by the prime motive end (101), pivoting of the radial relay clutch (1086) causing the relay output clutch structure (1051) on another end (1089) of the radial clutch transmission block (1082) to engage the output-end clutch structure (1052).

11. A clutch device as recited in claim 1, wherein said clutch (2006) is a radial clutch structure.

12. A clutch device as recited in claim 11, comprising at least two said radial clutch structures (2006) operating in different directions.

13. A clutch device as recited in claim 1, wherein said clutch (2006) is an axial clutch structure.

14. A clutch device as recited in claim 13, comprising two said axial clutch structures (2006) operating in a same direction.

\* \* \* \* \*